US012772084B2

(12) United States Patent
Ji et al.

(10) Patent No.: US 12,772,084 B2
(45) Date of Patent: Oct. 20, 2026

(54) SIDELINK MEASUREMENT RESULT OBTAINING METHOD, SIDELINK MEASUREMENT RESULT SENDING METHOD, AND TERMINAL

(71) Applicant: VIVO MOBILE COMMUNICATION CO., LTD., Guangdong (CN)

(72) Inventors: Zichao Ji, Guangdong (CN); Rakesh Tamrakar, Guangdong (CN); Peng Sun, Guangdong (CN); Huaming Wu, Guangdong (CN); Siqi Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 385 days.

(21) Appl. No.: 17/665,785

(22) Filed: Feb. 7, 2022

(65) Prior Publication Data

US 2022/0159500 A1 May 19, 2022

Related U.S. Application Data

(63) Continuation of application No. PCT/CN2020/107789, filed on Aug. 7, 2020.

(30) Foreign Application Priority Data

Aug. 8, 2019 (CN) ......................... 201910731324.5

(51) Int. Cl.
*H04W 24/10* (2009.01)

(52) U.S. Cl.
CPC ................................... *H04W 24/10* (2013.01)

(58) Field of Classification Search
CPC ..... H04W 24/10; H04W 92/18; H04W 72/20; H04W 72/04; H04W 72/02;
(Continued)

(56) References Cited

U.S. PATENT DOCUMENTS

2013/0322276 A1* 12/2013 Pelletier ................ H04W 24/10 370/252
2018/0054237 A1 2/2018 Tseng et al.
2020/0304272 A1* 9/2020 Lee ....................... H04L 5/0064
(Continued)

FOREIGN PATENT DOCUMENTS

CN 106900005 A 6/2017
CN 108702244 A 10/2018
(Continued)

OTHER PUBLICATIONS

Interdigital, Inc., "Physical Layer Procedures for NR V2X Sidelink", 3GPP TSG RAN WG1 #98bis, R1-1911280, Chongqing, China, Oct. 14-20, 2019.
(Continued)

*Primary Examiner* — Ricky Q Ngo
*Assistant Examiner* — David M Kayal
(74) *Attorney, Agent, or Firm* — Price Heneveld LLP

(57) ABSTRACT

A sidelink measurement result obtaining method, a sidelink measurement result sending method, and a terminal are provided. The method includes: obtaining a sidelink measurement result, where associated information of the measurement result corresponds to a measurement signal associated with the measurement result, and the associated information includes at least one of the following: a feedback window, identifier information, a feedback resource, and HARQ feedback information, where the HARQ feedback information is HARQ feedback information sent together with the measurement result, and the HARQ feedback information corresponds to a measurement signal.

20 Claims, 4 Drawing Sheets

(58) Field of Classification Search
CPC .......... H04W 72/0446; H04W 72/0453; H04L 5/0055; H04L 5/0048; H04L 1/1812
See application file for complete search history.

(56) References Cited

U.S. PATENT DOCUMENTS

| | | | | |
|---|---|---|---|---|
| 2020/0337024 | A1* | 10/2020 | Tang | H04L 5/0048 |
| 2020/0374031 | A1* | 11/2020 | Baldemair | H04L 1/003 |
| 2020/0374858 | A1* | 11/2020 | Vargas | H04W 72/20 |
| 2021/0391909 | A1* | 12/2021 | Lee | H04W 72/23 |
| 2022/0014338 | A1* | 1/2022 | Yoshioka | H04W 8/005 |
| 2022/0015067 | A1* | 1/2022 | Li | H04L 5/0055 |
| 2022/0104238 | A1* | 3/2022 | Aiba | H04W 72/20 |
| 2022/0110104 | A1* | 4/2022 | Li | H04L 5/0055 |
| 2022/0150730 | A1* | 5/2022 | Freda | H04L 1/188 |
| 2022/0232549 | A1* | 7/2022 | Yeo | H04L 5/0048 |
| 2022/0329301 | A1* | 10/2022 | Shin | H04B 7/0632 |

FOREIGN PATENT DOCUMENTS

| | | | |
|---|---|---|---|
| CN | 109246659 | A | 1/2019 |
| CN | 109644455 | A | 4/2019 |
| EP | 3890246 | A1 | 6/2021 |
| WO | 2021010773 | A1 | 1/2021 |

OTHER PUBLICATIONS

Samsung, "On Sidelink CSI Procedure", 3GPP TSG RAN WG1 #97, R1-1906949, Reno, USA, May 13-17, 2019.

Interdigital, Inc., "Physical Layer Procedures for NR V2X Sidelink", 3GPP TSG RAN WG1 #97, R1-1907096, Reno, USA, May 13-17, 2019.

Ericsson, "On SCI formats", 3GPP TSG-RAN WG1 Meeting #94bis, R1-1813649, Chengdu, China, Oct. 8-12, 2018.

* cited by examiner

SIDELINK MEASUREMENT RESULT OBTAINING METHOD, SIDELINK MEASUREMENT RESULT SENDING METHOD, AND TERMINAL

CROSS-REFERENCE OF RELATED APPLICATION

This application is a continuation application of PCT International Application No. PCT/CN2020/107789 filed on Aug. 7, 2020, which claims priority to Chinese Patent Application No. 201910731324.5 filed in China on Aug. 8, 2019, the disclosures of which are incorporated herein by reference in their entireties.

TECHNICAL FIELD

The present disclosure relates to the field of communications technologies, and in particular, to a sidelink measurement result obtaining method, a sidelink measurement result sending method, and a terminal.

BACKGROUND

Some communication systems support sidelink (or referred to as a direct communication link or the like) transmission, that is, terminals can directly transmit data between each other on a physical layer. Furthermore, some communication systems (for example, 5G communication systems) support unicast, multicast, and broadcast communication on a sidelink, to support more comprehensive service types. However, a sidelink is mainly used for data transmission and sidelink measurement is not supported. As a result, transmission performance of a sidelink is relatively poor.

SUMMARY

The embodiments of the present disclosure provide a sidelink measurement result obtaining method, a sidelink measurement result sending method, and a terminal.

According to a first aspect, some embodiments of the present disclosure provide a sidelink measurement result obtaining method, applied to a first terminal and including:

obtaining a sidelink measurement result, where associated information of the measurement result corresponds to a measurement signal associated with the measurement result, and the associated information includes at least one of the following:

a feedback window, identifier information, a feedback resource, and hybrid automatic repeat request (HARQ) feedback information, where the HARQ feedback information is HARQ feedback information sent together with the measurement result, and the HARQ feedback information corresponds to a measurement signal.

According to a second aspect, some embodiments of the present disclosure provide a sidelink measurement result sending method, applied to a second terminal and including:

sending a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

According to a third aspect, some embodiments of the present disclosure provide a terminal, where the terminal is a first terminal and includes:

an obtaining module, configured to obtain a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

According to a fourth aspect, some embodiments of the present disclosure provide a terminal, where the terminal is a second terminal and includes:

a sending module, configured to send a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

According to a fifth aspect, some embodiments of the present disclosure provide a terminal, where the terminal is a first terminal and includes: a memory, a processor, and a program stored in the memory and executable on the processor. When the program is executed by the processor, the steps of the sidelink measurement result obtaining method provided by some embodiments of the present disclosure are implemented.

According to a sixth aspect, some embodiments of the present disclosure provide a terminal, where the terminal is a second terminal and includes: a memory, a processor, and a program stored in the memory and executable on the processor. When the program is executed by the processor, the steps of the sidelink measurement result sending method provided by some embodiments of the present disclosure are implemented.

According to a seventh aspect, some embodiments of the present disclosure provide a computer-readable storage medium, storing a computer program. When the computer program is executed by a processor, the steps of the sidelink measurement result obtaining method provided by some embodiments of the present disclosure are implemented, or when the computer program is executed by a processor, the steps of the sidelink measurement result sending method provided by some embodiments of the present disclosure are implemented.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The term "include" and any other variants in the specification and claims of this application are intended to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in this specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. A sidelink measurement result obtaining method, a sidelink measurement result sending method, and a terminal provided in some embodiments of this disclosure may be applied to a wireless communications system. The wireless communications system may be a 5G system, an evolved Long Term Evolution (eLTE) system, a Long Term Evolution (LTE) system, a subsequent evolved communications system, or the like.

Figure 1:
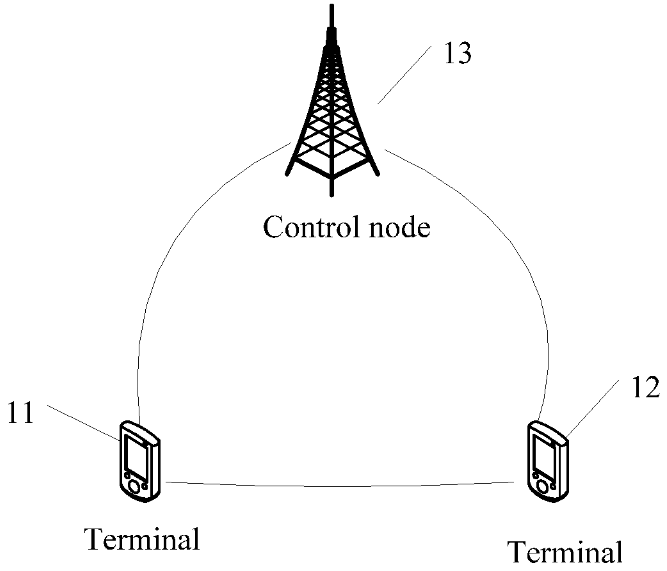
FIG. 1 is a structural diagram of a network system that can be applied to some embodiments of the present disclosure.

FIG. 1 is a structural diagram of a network system that can be applied to some embodiments of the present disclosure. As shown in FIG. 1, the network system includes a terminal 11, a terminal 12, and a control node 13. The terminal 11 and the terminal 12 can communicate with each other on a sidelink through a PC5 interface, and the control node 13 and the terminal (including the terminal 11 and the terminal 12) can communicate with each other on an uplink and a downlink (UL and DL) through an air interface (Uu) interface. The terminal 11 and the terminal 12 may be user terminals (User Equipment, UE) or other terminal side devices, for example, terminal side devices such as a mobile phone, a tablet personal computer (TPC), a laptop computer (LC), a personal digital assistant (PDA), a mobile Internet device (MID), a wearable device (WD), a smart car, an in-vehicle device, or a robot. It should be noted that a specific type of the terminal is not limited in some embodiments of the present disclosure. The control node 13 may be a network device such as a base station in 4G, a base station in 5G or later releases, or a base station in other communications systems, or is referred to as a Node B, an evolved Node B, a transmission reception point (TRP), an access point (AP), or other words in the field, as long as the same technical effect is achieved. The network device is not limited to specific technical words. Alternatively, the control node 13 may be some integrated access backhaul (IAB) nodes, some sidelink terminals, relays, or road side units (RSUs), and certainly may be some other network devices similar to an RSU or an IAB. Further, some control nodes 13 may support a sidelink or a Uu link, and may also support a sidelink and a Uu link at the same time, which is not limited in some embodiments of the present disclosure. It should be noted that a specific type of the control node 13 is not limited in some embodiments of the present disclosure.

Figure 2:
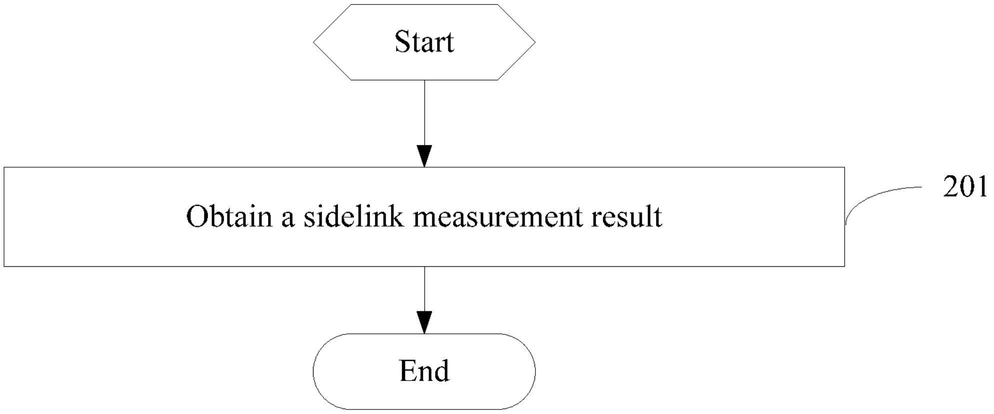
FIG. 2 is a flowchart of a sidelink measurement result obtaining method according to some embodiments of the present disclosure.

FIG. 2 is a flowchart of a sidelink measurement result obtaining method according to some embodiments of the present disclosure. The method is applied to a first terminal, and as shown in FIG. 2, includes the following steps.

Step 201: Obtain a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

The first terminal is a terminal that sends the measurement signal.

The sidelink measurement result is a measurement result obtained by measuring the sidelink, and the measurement signal is a measurement signal sent on the sidelink. Obtaining the sidelink measurement result may be receiving the sidelink measurement result on the sidelink. For example, the measurement result may be a measurement result sent by the second terminal on the sidelink, where the second terminal is a terminal that receives the measurement signal. Alternatively, the measurement result may be a sidelink measurement result sent by other nodes other than the second terminal, for example, a sidelink measurement result forwarded by a control node or another transit terminal. Specifically, if the second terminal sends the sidelink measurement result to the control node or another transit terminal, the control node or another transit terminal forwards the sidelink measurement result to the first terminal.

That the associated information of the measurement result corresponds to the measurement signal associated with the measurement result may be: there is a correspondence between the associated information and the measurement signal. Specifically, it can be understood as that the associated information can be used to identify the measurement result, or the measurement signal associated with the measurement result includes the measurement signal corresponding to the associated information. Therefore, the first terminal can use the associated information to identify the measurement signal associated with the measurement result, to avoid sidelink transmission adjustment errors, thereby avoiding subsequent data transmission failures and improving transmission performance of the sidelink.

It should be noted that since the associated information corresponds to the measurement signal, the associated information can also be understood as associated information of the measurement signal, but the first terminal can obtain the associated information by obtaining the measurement result, to identify the measurement signal.

In addition, in some embodiments of the present disclosure, the measurement signal may be at least one of a channel state indication reference signal (CSI-RS), a demodulation reference signal (DMRS), a sidelink system information block (S-SSB), and the like. The measurement result can be at least one of a channel state indicator (CSI), a channel quality indicator (CQI), a precoding matrix indicator (PMI), a CSI-RS resource indicator (CRI), an SS/PSBCH block resource indicator (SSBRI), a layer indicator (LI), a rank indicator (RI), reference signal receiving power (RSRP), and the like.

The feedback window may be a feedback window of the measurement result, and the window may be a time domain window. These feedback windows are associated with the measurement signal. For example, the correspondence between the feedback window and the measurement signal is pre-configured, or the feedback window is started when the measurement signal is sent.

The identifier information may be one or more pieces of identifier information associated with the measurement result. For example, the identifier information is carried in the measurement result, or a message for sending the measurement result includes the measurement result and the identifier information. These pieces of identifier information are associated with measurement signals, for example, these pieces of identifier information can be used to indicate the measurement signals.

The feedback resource may be a resource used for feedback of the measurement result. These resources may be one or more of a frequency domain resource, a time domain resource, or a code domain resource, and these feedback resources are associated with measurement signals. For example, a correspondence between these feedback resources and measurement signals is pre-configured, or these feedback resources are allocated when the measurement signal is sent.

The HARQ feedback information is HARQ feedback information sent together with the measurement result. The HARQ feedback information may be carried in the measurement result, or a message for sending the measurement result includes the measurement result and the HARQ feedback information. The correspondence between the HARQ feedback information and the measurement signal may be: there is a correspondence between a data type or identifier corresponding to the HARQ feedback information and the measurement signal, or data transmission corresponding to the HARQ feedback information and the measurement signal are indicated by the same control signaling, or transmission of the HARQ feedback information and the measurement signal are indicated by the same control signaling, or data corresponding to the HARQ feedback information is sent together with the measurement signal, or data corresponding to the HARQ feedback information carries the measurement signal.

In some embodiments of the present disclosure, in the foregoing steps, the sidelink may be measured, and the measurement signal associated with the measurement result is determined according to the associated information of the measurement result, thereby improving transmission performance of the sidelink and avoiding sidelink transmission adjustment errors.

The following is detailed description of the feedback window, the identifier information, the feedback resource, and the HARQ feedback information:

Optionally, in a case that the associated information includes the feedback window, a measurement signal sent by the first terminal is associated with at least one feedback window, and the measurement signal associated with the measurement result includes:

a measurement signal associated with a feedback window of the measurement result.

In this implementation, when the first terminal sends a measurement signal, each measurement signal is associated with at least one feedback window. For example, a measurement signal is associated with at least one feedback window for receiving a measurement feedback, where a window length is N. In this way, when the measurement result is received, based on a feedback window of the measurement result, a measurement signal associated with the feedback window can be determined.

In an implementation, the at least one feedback window associated with the measurement signal sent by the first terminal may include:

at least one feedback window that is started after the first terminal sends the measurement signal, where an attribute of the at least one feedback window may be related to at least one of the following parameters:

a terminal processing capability, a resource pool configuration, bandwidth part (BWP) parameter set numerology, a BWP subcarrier spacing (SCS), carrier numerology, a carrier SCS, cell numerology, and a cell SCS.

The attribute may include at least one of a start time of the feedback window and a length of the window.

The terminal processing capability may be a processing capability of the first terminal or a processing capability of the second terminal, the resource pool configuration may be a resource pool configuration of the sidelink, and the BWP, the carrier, and the cell may be a BWP, a carrier, and a cell of the sidelink.

The attribute may be related to at least one of the foregoing parameters. The attribute may be determined based on at least one of the foregoing parameters. For example, the window length N is not less than a processing delay of the terminal, or the start time T of the window is a sending time of the measurement signal+a processing delay of the terminal, or different BWPs, carriers, or resource pool configurations, or different numerology may have different processing delays or window lengths, or different terminal types may have different processing delays or window lengths.

It should be noted that the relationship between the parameters and the attribute can be pre-configured or indicated by a control node. In addition, a parameter may correspond to an attribute value, or a parameter may correspond to an attribute value range or an attribute reference value.

In an implementation, an attribute of the at least one feedback window does not change, or an attribute of the at least one feedback window is dynamically adjusted according to a quality of service (QoS) requirement, a channel state, or a link congestion status.

The QoS requirement can be a priority requirement, a delay requirement, a reliability requirement, or the like, and the link congestion condition status can be a channel busy ratio (CBR) measurement result, a channel occupancy ratio (CR) measurement result, or the like.

In addition, that the attribute of the feedback window does not change may be: an attribute corresponding to a parameter does not change, for example, one parameter corresponds to one attribute value. The dynamic adjustment can be: an attribute corresponding to a parameter can be dynamically adjusted. For example, a parameter corresponds to an attribute value range or an attribute reference value, and can be dynamically adjusted within this range or dynamically adjusted based on the attribute reference value.

For example, for a parameter (a resource pool configuration, a carrier, numerology, or the like), the window length of the feedback window can be a fixed length, for example, defined in the protocol or determined based on a network configuration. Alternatively, the window length of the feedback window is a variable length, for example, dynamically adjusted according to a QoS requirement, a channel state, or a link congestion status (for example, when the link is congested, a longer window is used).

It should be noted that in some embodiments of the present disclosure, a time unit granularity of the feedback window may be a radio frame, a subframe, a slot, a sub-slot, a symbol, or the like. The window length can be based on a system time (system frame number, SFN), a sidelink time (direct frame number, DFN), valid time domain information of a resource pool, or the like.

In addition, the feedback window can be configured by the control node, directly negotiated between a sending terminal and a receiving terminal, defined in the protocol, pre-configured, or the like.

In an implementation, if the at least one feedback window expires and no measurement result is obtained, the first terminal no longer waits for a measurement result of the measurement signal associated with the at least one feedback window.

In this way, if the measurement result is not received in the feedback window, it is determined that feedback of a feedback result of the measurement signal fails. The first terminal no longer waits, to avoid that the first terminal continues to wait, which wastes resources.

For example, after sending the measurement signal, the first terminal starts the feedback window at a time T.

The first terminal waits to receive the measurement feedback of the terminal in a window T+N, and may start a timer with a length of N.

The first terminal considers that the window time expires when any one of the following conditions is met:

- if the first terminal receives at least one valid measurement feedback in the window, it is considered that the window time expires and the timer can be stopped; and
- if the first terminal still receives no measurement feedback when the window time expires, it is considered that the window time expires, and it can be determined that the timer expires.

If the window time expires, the first terminal no longer waits for feedback of the measurement signal.

Further, in at least one feedback window of the measurement signal, the first terminal does not send a second measurement signal.

After receiving the measurement signal, the second terminal can feed back the measurement result in the window (within the time T+N). For example, a timer with a length N is started and the timer is stopped after a feedback is sent. If the second terminal cannot send a feedback in this window (for example, the second terminal cannot transmit the feedback because a sidelink resource cannot be obtained, or the second terminal cannot send the feedback because of half-duplex restriction, or sending of the feedback fails, or the feedback cannot be sent because of restricted power, or the like), the second terminal may discard the measurement result and does not feed back the measurement result outside the window. In addition, if sending of the feedback still does not succeed when the timer expires, the measurement result can also be discarded.

If the second terminal receives, in the window, a new measurement signal sent by the first terminal, the second terminal can abandon the previously received measurement signal and measurement result, re-determine a window start time, and feed back a measurement result associated with the new measurement signal in the window. For example, a timer with a length N can be restarted.

It should be noted that, in some embodiments of the present disclosure, the resource for sending the measurement signal may be obtained by the first terminal through resource sensing (sensing) and reservation, or may be allocated by the control node. The resource for sending a measurement feedback may be obtained by the second terminal through resource sensing (sensing) and reservation, or may be allocated by the control node.

The following is an example in which the first terminal is UE1, the second terminal is UE2, and the measurement signal is a CSI-RS, including the following content:

1. UE1 and UE2 perform sidelink transmission, UE1 is configured with a measurement signal CSI-RS for measurement by UE2, and the length of a feedback window is 4 slots.
2. UE1 sends CSI-RS1 at a time T1 and waits for a feedback from UE2.
3. UE2 measures CSI-RS1, obtains a resource at a time T1+3, and feeds back a measurement result of CSI-RS1 to UE1.
4. UE1 sends CSI-RS2 at a time T2 and waits for a feedback from UE2.
5. UE2 measures CSI-RS2, but obtains no resource in a window [T2, T2+4], provides no feedback to UE1, and discards a measurement result.
6. UE1 receives no feedback until T2+4, therefore no longer waits for feedback from UE2, and sends CSI-RS3 to UE2 at a subsequent time T3.

The foregoing is only an example in which the fixed window length is 4 slots. The length can also be dynamically changed. For example, if CBR measurement shows that the link is congested, a longer window is used (because it may be difficult to reserve a sending resource for the UE in this case), and if the link is idle, a shorter window is used.

It should be noted that the following effects can be achieved through the feedback window:

For each received measurement result, the first terminal knows CSI-RS associated with the measurement result.

Feedback overheads are low, and only the measurement result needs to be carried in a measurement result feedback and no other information is required (for example, associated identifier information).

Control signaling overheads are low, and control signaling (for example, an SCI) indicating the measurement signal does not need to carry additional indicators (for example, an allocation index in the SCI).

Optionally, in a case that the associated information includes the identifier information,

- the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

That the identifier information is used to associate with the measurement signal may be: the identifier information is used to identify the measurement signal associated with the measurement result. For example, the identifier information is used to associate with a specific measurement signal, so that the first terminal can know, based on the identifier information, a measurement signal associated with the measurement result, and whether the second terminal fails to detect a measurement signal.

That the identifier information is used to associate with the parameter information of the measurement signal may be: the identifier information is used to identify parameter information of the measurement signal associated with the measurement result, so that the specific measurement signal can be determined based on the parameter information.

The parameter information may include at least one of the following:

time domain information, frequency domain information, code domain information, an identifier, feedback window information, control signaling information, and a time interval relative to a transmission moment of the measurement result.

The time-domain information may be a sub-frame, a slot/sub-slot, a symbol number, or the like of the measurement signal. The frequency-domain information may be a start physical resource block (PRB), a sub-channel index of the measurement signal, or the like. The code domain information may be a measurement signal sequence or a scrambling sequence or an orthogonal cover code (OCC) sequence, or the like. The feedback window information may be feedback window information related to the measurement signal, such as start time domain information or a window length, or the control signaling information may be an allocation index in the SCI or a HARQ process number or an SCI resource location or index, or the like.

In this implementation, the measurement signal associated with the measurement result can be determined based on at least one of the parameters.

In addition, to reduce overheads, the identifier information may be a result obtained by performing a specific operation on at least one piece of the foregoing parameter information, for example, a result of a modular operation (MOD) performed on the slot index or the sub-channel index, for example, the identifier information=the slot index mod K, where K is defined/configured (pre-configured).

Optionally, in a case that the associated information includes the identifier information, the obtaining a measurement result includes:

obtaining a measurement result message, where the measurement result message carries one or more measurement results and identifier information of each measurement result.

The payload of the measurement result message may carry the one or more measurement results and the identifier information of each measurement result, the payload has a fixed size or a variable size, and in a case that the payload has a variable size, the measurement result message further carries a measurement result number indicator.

In this way, when the second terminal feeds back a measurement result, multiple measurement results can be carried in one feedback. The payload of the measurement result can be designed as follows:

1. A payload of a fixed size. Regardless of the number of measurement results that the second terminal actually needs to feed back, the payload can be divided into N parts, each part includes one or more measurement results and (optionally) identifier information associated with the measurement result. In addition, measurement results can be arranged according to a time sequence or a frequency domain sequence or types or groups of the measurement results. For a part that corresponds to no measurement result, the second terminal can fill a special value (for example, an invalid value).
2. The payload of a variable size. The payload can be a media access control control element (MAC CE) or piggybacked in a PSSCH. If the payload is a MAC CE, the MAC CE includes an indicator of the number of valid measurement results that are fed back, and each measurement result and (optionally) identifier information associated with the measurement result. If the payload is piggybacked in a PSSCH, the feedback includes multiple measurement results and (optionally) identifier information associated with the measurement result. Alternatively, the feedback includes a part of a fixed size that indicates a feedback result number, and a part of a variable size that includes each measurement result and (optionally) identifier information associated with the measurement result.

For example: in step 201, the first terminal may obtain one or more measurement results. For example: after sending the measurement signal, the first terminal waits for the measurement feedback of the second terminal, and before receiving a valid measurement feedback, the first terminal can still send a new measurement signal. After receiving the measurement signal, the second terminal feeds back the measurement result to the first terminal. One or more measurement results can be carried in one feedback, and each result is associated with one piece of identifier information or a group of identifier information (for example, an ID).

Further, if the identifier information associated with the measurement results is the same, the second terminal may feed back only one result or some results. For example: the measurement results can be selected based on priorities. The priorities can be a time sequence of associated measurement signals (for example, if a measurement signal is sent earlier or later, the priority is higher), or QoS information indicated in a scheduling instruction (for example, an SCI), or resource allocation properties of the measurement signals (for example, if the bandwidth of a measurement signal is larger, the priority is higher).

Alternatively, the second terminal may also combine and feed back the measurement results of the group of measurement signals, for example, measure multiple measurement signals in the group, and perform operations such as averaging or filtering on the results to obtain and feed back a combined measurement result.

Further, there is a time interval between sending times of a plurality of measurement signals whose parameter information overlaps. This effectively avoids feedback errors in some scenarios. That the parameter information overlaps may be: a part or all of the at least one piece of parameter information overlaps. For example, if some or all attributes of two measurement signals overlap (for example, the measurement signal includes the same bandwidth, PRB, sub-channel, or start frequency domain position, or the like), the second terminal can expect (or consider or assume) that there is at least one time interval between the transmission of the two measurement signals, that is, the first terminal does not send a measurement signal with the same identifier to the same second terminal within a feedback window.

Figure 3:
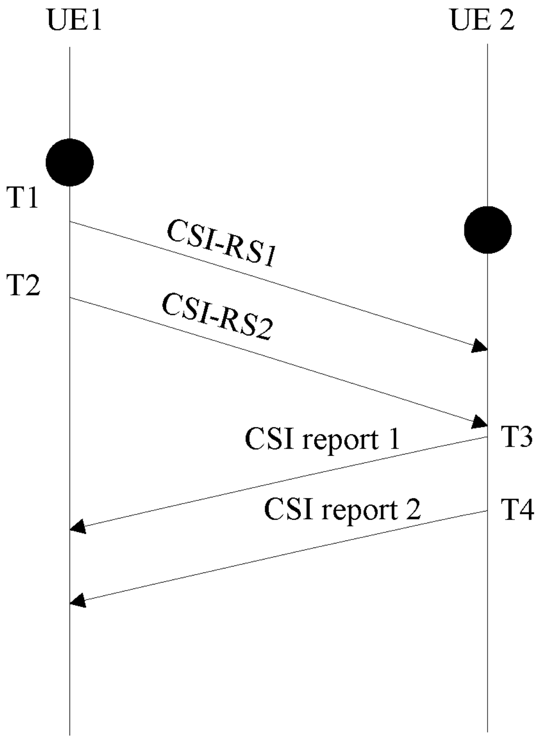
FIG. 3 is a schematic diagram of feeding back a sidelink measurement result according to some embodiments of the present disclosure.

The following is an example in which the first terminal is UE1, the second terminal is UE2, and the measurement signal is a CSI-RS, including the following content:

1. UE1 and UE2 perform sidelink transmission, UE1 is configured with a measurement signal CSI-RS for measurement by UE2.
2. UE1 sends CSI-RS1 and CSI-RS2 to UE2 at a time T1 and a time T2 respectively, as shown in FIG. 3.
3. UE2 obtains resources at the time T3 and the time T4, and feeds back measurement results of CSI-RS1 and CSI-RS2 to UE1, as shown in FIG. 3.
4. Each feedback result carries a measurement result and identifier information of a CSI-RS associated with the measurement result, for example, slot MOD P of CSI-RS or start sub-channel index MOD Q of a CSI-RS is sent. P and Q are predefined constants.

It should be noted that the following effects can be achieved through the identifier information:

For each received measurement result feedback, according to identifier information in the feedback, the first terminal knows a measurement signal associated with the measurement result. Regardless of whether the second terminal fails to detect a CSI-RS or the first terminal does not receive a measurement feedback, the first terminal can find a specific transmission that fails.

The transmission delay of a measurement signal is low, and multiple measurement signals can be sent continuously for measurement, which helps to improve measurement accuracy.

Control signaling overheads are low, and control signaling (for example, an SCI) indicating the measurement signal does not need to carry additional indicators (for example, an allocation index in the SCI).

Figure 4:
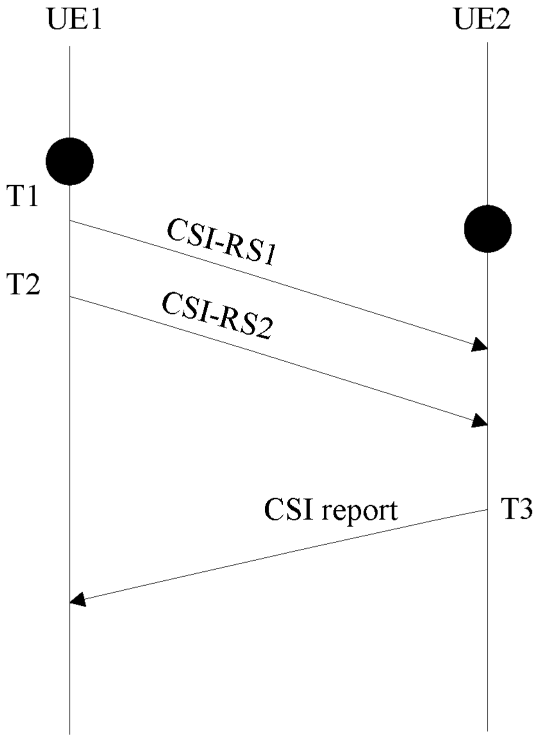
FIG. 4 is another schematic diagram of feeding back a sidelink measurement result according to some embodiments of the present disclosure.

The following is still an example in which the first terminal is UE1, the second terminal is UE2, and the measurement signal is a CSI-RS, including the following content:

1. UE1 and UE2 perform sidelink transmission, UE1 is configured with a measurement signal CSI-RS for measurement by UE2.
2. UE1 sends CSI-RS1 and CSI-RS2 to UE2 at a time T1 and a time T2 respectively, as shown in FIG. 4.
3. UE2 obtains a resource at a time T3, and simultaneously feeds back measurement results of CSI-RS1 and CSI-RS2 to UE1, as shown in FIG. 4.

The feedback result carries the number (2) of measurement results that are fed back, and each measurement result and identifier information of a CSI-RS associated with the measurement result.

Alternatively, in another case, the feedback result carries one measurement result. The measurement result is a better and more accurate result obtained after UE2 combines the measurement results of CSI-RS1 and CSI-RS2. For example, CSI-RS1 occupies sub-channels 0 to 9 and CSI-RS2 occupies sub-channels 10 to 19. A wideband measurement result fed back by UE2 is more accurate than that only based on CSI-RS1 or CSI-RS2 because sub-channels 0 to 19 are measured.

It should be noted that the following effects can be achieved through the identifier information:

For each received measurement result feedback, according to identifier information in the feedback, the first terminal knows a measurement signal associated with the measurement result. If the second terminal fails to detect a measurement signal, the first terminal can find a specific transmission that is lost.

The transmission delay of a measurement signal is low, and multiple measurement signals can be sent continuously for measurement, which helps to improve measurement accuracy.

Control signaling overheads are low, and control signaling (for example, an SCI) indicating the measurement signal does not need to carry additional indicators (for example, an allocation index in the SCI).

Optionally, in a case that the associated information includes the feedback resource, the first terminal is allocated with a feedback resource of the measurement result when sending the measurement signal, and the measurement signal associated with the measurement result includes:

a measurement signal corresponding to the feedback resource of the measurement result.

In this implementation, when the first terminal sends a measurement signal, a resource for feeding back a measurement result is allocated for the measurement signal, so that the first terminal obtains the measurement result from the second terminal based on the resource, and determines, based on the resource for feeding back the measurement result, the measurement signal associated with the measurement result. For example: when sending a measurement signal, the first terminal allocates a resource to the second terminal to send a measurement feedback. The first terminal may indicate the measurement signal in control signaling (for example, an SCI, a MAC CE, or RRC), and at the same time indicate (including: reserve and allocate) a sidelink resource to the second terminal.

In addition, the measurement signal and the resource can be indicated by using the same or different control signaling, for example, the SCI indicates the measurement signal and the MAC CE indicates the sidelink resource. An identifier of the second terminal may be carried in signaling indicating resource reservation, for example, the MAC CE indicates both the sidelink resource and a terminal transmitting the feedback information on the resource.

Further, the feedback resource may be used to send data, and the measurement result is carried in the data for feedback. This can save resources.

For example, the second terminal uses the resource to send data (the data may be sent to the first terminal or other terminals in unicast or multicast or other manners), and also uses the data to carry a measurement feedback. In addition, one or more measurement results can be carried in one feedback. When multiple results are carried, each result can be associated with one piece of identifier information or a group of identifier information. For details, refer to the corresponding description of the foregoing implementation of identifier information, which will not be repeated herein.

It should be noted that the feedback resource may not be limited to send data. For example, the feedback resource can be used only to feed back a measurement result, but not to send data.

The following is an example in which the first terminal is UE1, the second terminal is UE2, and the measurement signal is a CSI-RS, including the following content:

1. UE1 and UE2 perform sidelink transmission, and UE1 is configured with a measurement signal CSI-RS for measurement by UE2.

2. UE1 sends a PSSCH to UE2 at a time T1, and indicates CSI-RS transmission in an SCI that schedules the PSSCH. At the same time, the SCI reserves a resource for a subsequent time T2 for UE2.
3. UE2 receives the SCI, measures the CSI-RS, and feeds back a measurement result at the time T2 on the resource reserved by the SCI.

It should be noted that the following effects can be achieved through the feedback resource:

For each received measurement result feedback, the first terminal knows a measurement signal associated with the measurement result. If the second terminal fails to detect the transmission at the time T1, the data from the second terminal is not received on the resource reserved by the first terminal at the time T2. Therefore, it can be found that the transmission is lost.

The transmission delay of a measurement signal is low, and multiple measurement signals can be sent continuously for measurement, which helps to improve measurement accuracy.

Feedback overheads are low.

Optionally, in a case that the associated information includes the HARQ feedback information, the data sent by the first terminal carries a measurement signal, and the measurement signal associated with the measurement result includes:

a measurement signal carried by data corresponding to the HARQ feedback information of the measurement result.

The HARQ feedback information is HARQ feedback information for the data sent by the first terminal. Since the data sent by the first terminal carries the measurement signal, and the feedback information is HARQ feedback information sent together with the measurement result, after receiving the measurement result and the HARQ feedback information, the first terminal can determine the corresponding data, and then determine the corresponding measurement signal.

For example, the first terminal sends physical sidelink shared channel (PSSCH) data, which carries the measurement signal to the second terminal, and the first terminal can indicate a PSSCH resource and the measurement signal in control signaling (for example, an SCI, a MAC CE, or RRC).

When receiving the PSSCH data, the second terminal demodulates the PSSCH data, and measures a measurement signal associated with the PSSCH. Subsequently, the second terminal sends a HARQ feedback of the PSSCH data and a measurement feedback of the measurement signal associated with the PSSCH data at the same time. The second terminal may send the HARQ feedback and the measurement feedback by using a physical sidelink feedback channel (PSFCH) resource of the HARQ feedback, or carry the HARQ feedback and the measurement feedback in a PSSCH resource for transmission.

In addition, multiple candidate PSFCHs may be pre-configured, and the second terminal selects one of the PSFCHs to feed back the HARQ feedback information, and indicates the measurement result by using the PSFCH that is used to feed back the HARQ feedback information, that is, the first terminal receives the HARQ feedback information to obtain the measurement result. For example, PSFCH-0 and PSFCH-1 are pre-configured. When the second terminal feeds back the measurement result, if the measurement result 0 is fed back, PSFCH-0 is selected to send HARQ feedback information to indicate the measurement result 0 through the PSFCH-0. Otherwise, PSFCH-1 is selected to send HARQ feedback information to indicate the measurement result 1 through PSFCH-1.

It should be noted that the measurement result 0 and the measurement result 1 may be measurement result indexes, and the first terminal can determine specific measurement result content through the indexes. Certainly, a specific value of the measurement result may be 0 or 1. In addition, the measurement results 0 and 1 are only examples. For example, N candidate PSFCHs can be configured to represent N measurement results.

Similarly, in this implementation, one or more measurement results can be carried in one feedback. When multiple results are carried, each result can be associated with one piece of identifier information or a group of identifier information. For details, refer to the corresponding description of the foregoing implementation of identifier information, which will not be repeated herein.

The first terminal receives the HARQ feedback and the measurement feedback, and can determine, according to associated PSSCH data transmission, the measurement signal associated with the measurement feedback.

The following is an example in which the first terminal is UE1, the second terminal is UE2, and the measurement signal is a CSI-RS, including the following content:

1. UE1 and UE2 perform sidelink transmission, and UE1 is configured with a measurement signal CSI-RS for measurement by UE2.
2. UE1 sends a PSSCH to UE2 at a time T1, and indicates CSI-RS transmission in an SCI that schedules the PSSCH.
3. UE2 receives the SCI, demodulates the PSSCH, and measures the CSI-RS.
4. At a time T2, UE2 carries the measurement result in a PSFCH channel used for HARQ feedback.

It should be noted that the following effects can be achieved through the HARQ feedback information:

For each received measurement result feedback, the first terminal knows a measurement signal associated with the measurement result. If the second terminal fails to detect the transmission at the time T1, the first terminal does not receive the feedback from the second terminal at the time T2. Therefore, it can be found that the transmission is lost.

The transmission delay of a measurement signal is low, and multiple measurement signals can be sent continuously for measurement, which helps to improve measurement accuracy.

Feedback overheads are low.

It should be noted that the foregoing implementations of the feedback window, the identifier information, the feedback resource, and the HARQ feedback information can be implemented in combination with each other. For example, the feedback window and the identifier information are combined:

The measurement signal sent by the first terminal is associated with a feedback window.

In addition, the first terminal can still send a new measurement signal before receiving a valid measurement feedback.

After receiving the measurement signal, the second terminal feeds back the measurement result to the first terminal.

If the second terminal receives, in the window, multiple measurement signals sent by the first terminal, the second terminal may abandon some measurement results, or feed back a combined measurement. For example: if two signals have the same identifier, some measurement result may be abandoned, or an average signal measurement value may be obtained. Alternatively, if the second terminal receives, in the window, multiple measurement signals sent by the first terminal, the second terminal may carry one or more measurement results in one feedback, for example, identifiers of the measurement signals are different. In addition, each measurement result can be associated with one piece of identifier information.

If the measurement result exceeds the feedback window, the second terminal may discard the measurement result and does not feed back the result to the first terminal.

It should be noted that in some embodiments of the present disclosure, a measurement result may be a measurement result for one or more measurement signals, that is, a measurement result may be associated with one or more measurement signals. When the measurement result is associated with multiple measurement signals, the second terminal may measure multiple measurement signals in the feedback window time to obtain a measurement result. This helps to improve the accuracy of wideband measurement.

In addition, the feedback of the measurement result can be carried in a PSSCH or transmitted on a PSFCH channel, or the measurement result can be indicated by a PSFCH selected and used by the second terminal. For details, refer to the corresponding description of the foregoing pre-configured multiple candidate PSFCHs. The present disclosure does not limit the specific implementation of the feedback measurement result.

The sidelink measurement result obtaining method provided in some embodiments of the present disclosure can be used to feed back measurement results between terminals on a sidelink, and the association between the measurement signal and the measurement result can become clear, thereby solving the problem that because the terminals cannot determine the association between the measurement signal and the measurement result, link transmission adjustment errors and subsequent data transmission failures are caused.

Specifically, the association between the measurement signal and the measurement result can be determined by using one or more of the following methods:

1. Define a feedback window for the measurement signal. The second terminal only feeds back the measurement result in the feedback window.
2. The measurement feedback includes one or more measurement reports, and each measurement report includes the measurement result and the identifier information of the measurement signal associated with the result (for example, the initial PRB/sub-channel index of the CSI-RS).
3. When sending a measurement signal, the first terminal reserves resources for the second terminal to feed back the measurement result.
4. When sending the data HARQ feedback, the second terminal multiplexes the measurement result with the HARQ feedback for transmission.

Figure 5:
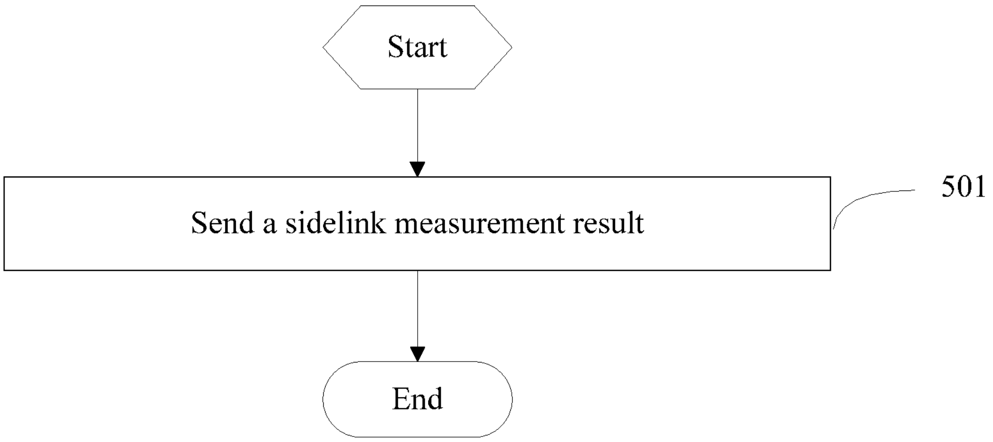
FIG. 5 is a flowchart of a sidelink measurement result sending method according to some embodiments of the present disclosure.

FIG. 5 is a flowchart of a sidelink measurement result sending method according to some embodiments of the present disclosure. The method is applied to a second terminal, and as shown in FIG. 5, includes the following steps.

Step 501: Send a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

It should be noted that sending the sidelink measurement result may be sending the sidelink measurement result on the sidelink. For example, the sidelink measurement result may be directly sent to the first terminal on the sidelink. Alternatively, the sidelink measurement result may be sent to a control node or another transit terminal, so that the control node or another transit terminal forwards the sidelink measurement result to the first terminal.

Optionally, in a case that the associated information includes the feedback window, a measurement signal received by the second terminal is associated with at least one feedback window, and the measurement signal associated with the measurement result includes:

a measurement signal associated with a feedback window of the measurement result.

Optionally, the at least one feedback window associated with the measurement signal received by the second terminal includes:

at least one feedback window that is started after the second terminal receives the measurement signal, where an attribute of the at least one feedback window is related to at least one of the following parameters:

a terminal processing capability, a resource pool configuration, BWP numerology, a BWP SCS, carrier numerology, a carrier SCS, cell numerology, and a cell SCS.

Optionally, an attribute of the at least one feedback window does not change, or an attribute of the at least one feedback window is dynamically adjusted according to a quality of service (QoS) requirement, a channel state, or a link congestion status.

Optionally, if the second terminal cannot feed back the measurement result within the at least one feedback window, the measurement result is discarded; and/or if the second terminal receives a new measurement signal in the at least one feedback window, the second terminal discards the measurement signal and measurement result corresponding to the at least one feedback window, starts at least one feedback window associated with the new measurement signal, and feeds back a measurement result of the new measurement signal.

Optionally, in a case that the associated information includes the identifier information, the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

Optionally, the parameter information includes at least one of the following:

time domain information, frequency domain information, code domain information, an identifier, feedback window information, control signaling information, and a time interval relative to a transmission moment of the measurement result.

Optionally, there is a time interval between sending times of a plurality of measurement signals whose parameter information overlaps.

Optionally, if there are a plurality of measurement results with the same identifier information, at least one of the plurality of measurement results is fed back, or the plurality of measurement results are combined and the combined measurement results are fed back.

Optionally, in a case that the associated information includes the identifier information, the sending a measurement result includes:

sending a measurement result message, where the measurement result message carries one or more measurement results and identifier information of each measurement result.

Optionally, the payload of the measurement result message carries the one or more measurement results and the identifier information of each measurement result, the payload has a fixed size or a variable size, and in a case that the payload has a variable size, the measurement result message further carries a measurement result number indicator.

Optionally, in a case that the associated information includes the feedback resource, the second terminal obtains the feedback resource of the measurement result when receiving the measurement signal, and the second terminal sends the measurement result on the feedback resource.

Optionally, the feedback resource is used to send data, and the second terminal sends, on the feedback resource, data that carries the measurement result.

Optionally, in a case that the associated information includes the HARQ feedback information, data received by the second terminal carries a measurement signal, and the measurement result of the measurement signal is fed back together with the HARQ feedback information of the data.

It should be noted that this embodiment is used as an implementation of the second terminal side corresponding to the embodiment shown in FIG. 2. For a specific implementation of this embodiment, refer to the related descriptions of the embodiment shown in FIG. 2. To avoid repeated descriptions, details are not described again in this embodiment. In this embodiment, the transmission performance of the sidelink can also be improved, and sidelink transmission adjustment errors can also be avoided.

Figure 6:
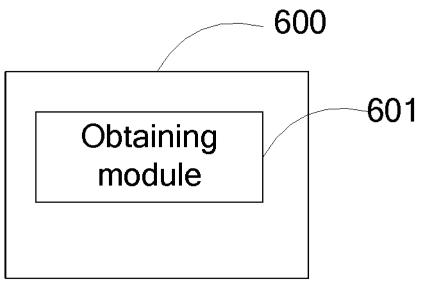
FIG. 6 is a structural diagram of a terminal according to some embodiments of the present disclosure.

FIG. 6 is a structural diagram of a terminal according to some embodiments of the present disclosure. The terminal is a first terminal. As shown in FIG. 6, the terminal 600 includes:

an obtaining module 601, configured to obtain a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

Optionally, in a case that the associated information includes the feedback window, a measurement signal sent by the first terminal is associated with at least one feedback window, and the measurement signal associated with the measurement result includes:

a measurement signal associated with a feedback window of the measurement result.

Optionally, the at least one feedback window associated with the measurement signal sent by the first terminal includes:

at least one feedback window that is started after the first terminal sends the measurement signal, where an attribute of the at least one feedback window is related to at least one of the following parameters:

a terminal processing capability, a resource pool configuration, BWP numerology, a BWP SCS, carrier numerology, a carrier SCS, cell numerology, and a cell SCS.

Optionally, an attribute of the at least one feedback window does not change, or an attribute of the at least one feedback window is dynamically adjusted according to a quality of service (QoS) requirement, a channel state, or a link congestion status.

Optionally, if the at least one feedback window expires and no measurement result is obtained, the first terminal no longer waits for a measurement result of the measurement signal associated with the at least one feedback window.

Optionally, in a case that the associated information includes the identifier information, the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

Optionally, the parameter information includes at least one of the following:

time domain information, frequency domain information, code domain information, an identifier, feedback window information, control signaling information, and a time interval relative to a transmission moment of the measurement result.

Optionally, there is a time interval between sending times of a plurality of measurement signals whose parameter information overlaps.

Optionally, in a case that the associated information includes the identifier information, the obtaining module 601 is configured to obtain a measurement result message, where the measurement result message carries one or more measurement results and identifier information of each measurement result.

Optionally, the payload of the measurement result message carries the one or more measurement results and the identifier information of each measurement result, the payload has a fixed size or a variable size, and in a case that the payload has a variable size, the measurement result message further carries a measurement result number indicator.

Optionally, in a case that the associated information includes the feedback resource, the first terminal is allocated with a feedback resource of the measurement result when sending the measurement signal, and the measurement signal associated with the measurement result includes:

a measurement signal corresponding to the feedback resource of the measurement result.

Optionally, the feedback resource is used to send data, and the measurement result is carried in the data for feedback.

Optionally, in a case that the associated information includes the HARQ feedback information, the data sent by the first terminal carries a measurement signal, and the measurement signal associated with the measurement result includes:

a measurement signal carried by data corresponding to the HARQ feedback information of the measurement result.

The terminal provided in some embodiments of this disclosure can implement the processes implemented by the first terminal in the method embodiments of FIG. 2. To avoid repetition, details are not described herein again. The transmission performance of the sidelink can also be improved, and sidelink transmission adjustment errors can also be avoided.

Figure 7:
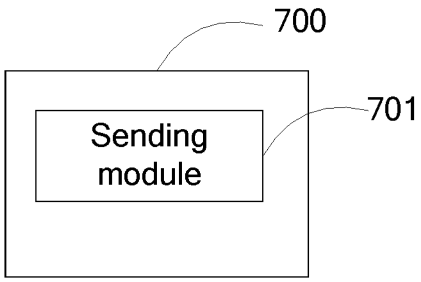
FIG. 7 is another structural diagram of a terminal according to some embodiments of the present disclosure.

FIG. 7 is a structural diagram of a terminal according to some embodiments of the present disclosure. The terminal is a second terminal. As shown in FIG. 7, the terminal 700 includes:

a sending module 701, configured to send a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

Optionally, in a case that the associated information includes the feedback window, a measurement signal received by the second terminal is associated with at least one feedback window, and the measurement signal associated with the measurement result includes:

a measurement signal associated with a feedback window of the measurement result.

Optionally, the at least one feedback window associated with the measurement signal received by the second terminal includes:

at least one feedback window that is started after the second terminal receives the measurement signal, where an attribute of the at least one feedback window is related to at least one of the following parameters:

a terminal processing capability, a resource pool configuration, BWP numerology, a BWP SCS, carrier numerology, a carrier SCS, cell numerology, and a cell SCS.

Optionally, an attribute of the at least one feedback window does not change, or an attribute of the at least one feedback window is dynamically adjusted according to a quality of service (QoS) requirement, a channel state, or a link congestion status.

Optionally, if the second terminal cannot feed back the measurement result within the at least one feedback window, the measurement result is discarded; and/or if the second terminal receives a new measurement signal in the at least one feedback window, the second terminal discards the measurement signal and measurement result corresponding to the at least one feedback window, starts at least one feedback window associated with the new measurement signal, and feeds back a measurement result of the new measurement signal.

Optionally, in a case that the associated information includes the identifier information, the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

Optionally, the parameter information includes at least one of the following:

time domain information, frequency domain information, code domain information, an identifier, feedback window information, control signaling information, and a time interval relative to a transmission moment of the measurement result.

Optionally, there is a time interval between sending times of a plurality of measurement signals whose parameter information overlaps.

Optionally, if there are a plurality of measurement results with the same identifier information, at least one of the plurality of measurement results is fed back, or the plurality of measurement results are combined and the combined measurement results are fed back.

Optionally, in a case that the associated information includes the identifier information, the sending module 701 is configured to send a measurement result message, where the measurement result message carries one or more measurement results and identifier information of each measurement result.

Optionally, the payload of the measurement result message carries the one or more measurement results and the identifier information of each measurement result, the payload has a fixed size or a variable size, and in a case that the payload has a variable size, the measurement result message further carries a measurement result number indicator.

Optionally, in a case that the associated information includes the feedback resource, the second terminal obtains the feedback resource of the measurement result when receiving the measurement signal, and the second terminal sends the measurement result on the feedback resource.

Optionally, the feedback resource is used to send data, and the second terminal sends, on the feedback resource, data that carries the measurement result.

Optionally, in a case that the associated information includes the HARQ feedback information, data received by the second terminal carries a measurement signal, and the measurement result of the measurement signal is fed back together with the HARQ feedback information of the data.

The terminal provided in some embodiments of this disclosure can implement the processes implemented by the first terminal in the method embodiments of FIG. 5. To avoid repetition, details are not described herein again. The transmission performance of the sidelink can also be improved, and sidelink transmission adjustment errors can also be avoided.

Figure 8:
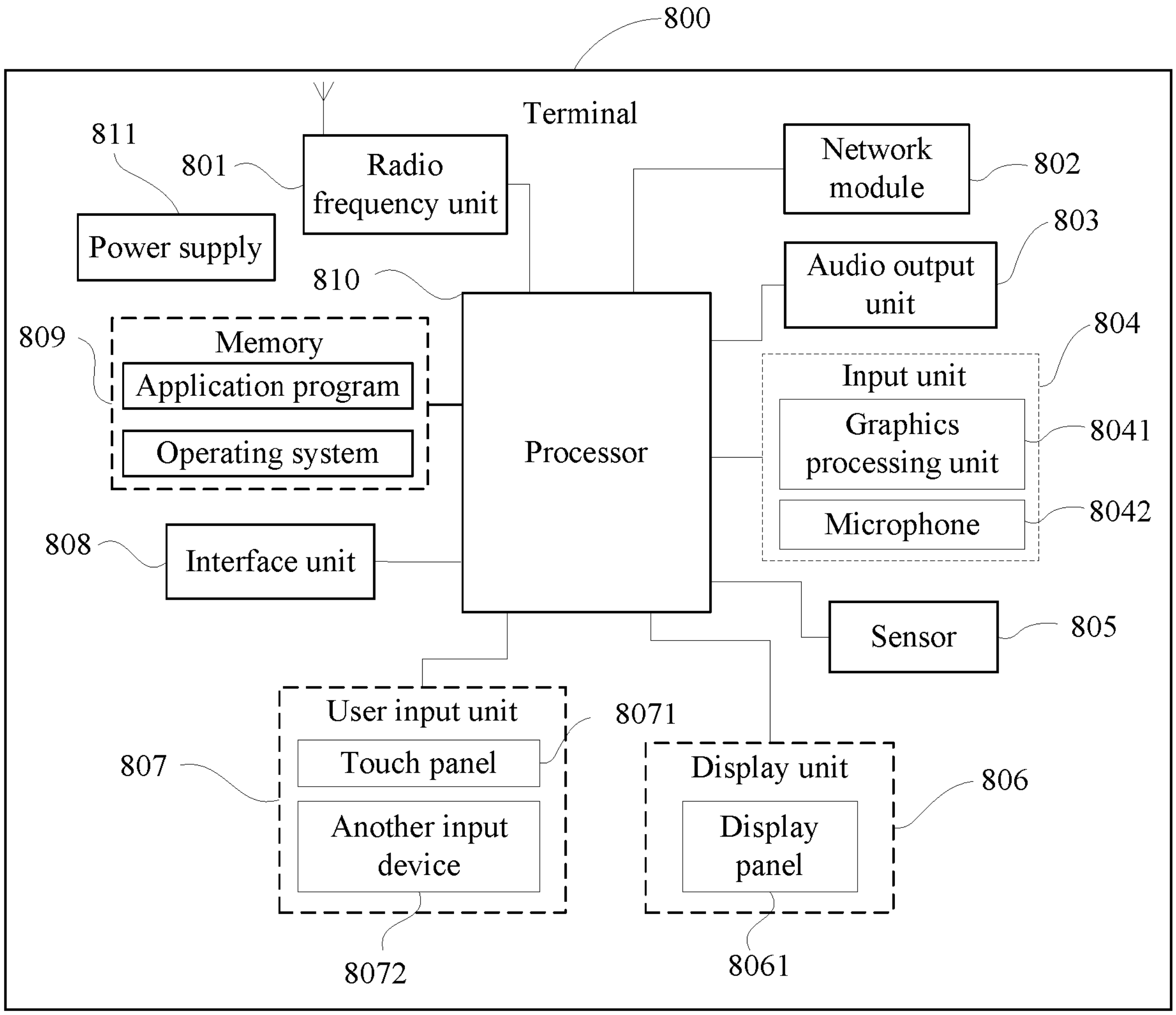
FIG. 8 is another structural diagram of a terminal according to some embodiments of the present disclosure.

FIG. 8 is a schematic diagram of a hardware structure of a terminal implementing various embodiments of this disclosure.

The terminal 800 includes but is not limited to: a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that a structure of the terminal shown in FIG. 8 does not constitute a limitation on the terminal, and the terminal may include more or fewer components than those shown in the figure, or combine some components, or have different component arrangements. In some embodiments of the present disclosure, the terminal includes but is not limited to a mobile phone, a tablet computer, a notebook computer, a palmtop computer, an vehicle-mounted terminal, a wearable device, a pedometer, and the like.

When the terminal is the first terminal:

The radio frequency unit 801 is configured to obtain a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

Optionally, in a case that the associated information includes the feedback window, a measurement signal sent by the first terminal is associated with at least one feedback window, and the measurement signal associated with the measurement result includes:

a measurement signal associated with a feedback window of the measurement result.

Optionally, the at least one feedback window associated with the measurement signal sent by the first terminal includes:

at least one feedback window that is started after the first terminal sends the measurement signal, where an attribute of the at least one feedback window is related to at least one of the following parameters:

a terminal processing capability, a resource pool configuration, BWP numerology, a BWP SCS, carrier numerology, a carrier SCS, cell numerology, and a cell SCS.

Optionally, an attribute of the at least one feedback window does not change, or an attribute of the at least one feedback window is dynamically adjusted according to a quality of service (QoS) requirement, a channel state, or a link congestion status.

Optionally, if the at least one feedback window expires and no measurement result is obtained, the first terminal no longer waits for a measurement result of the measurement signal associated with the at least one feedback window.

Optionally, in a case that the associated information includes the identifier information, the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

Optionally, the parameter information includes at least one of the following:

time domain information, frequency domain information, code domain information, an identifier, feedback window information, control signaling information, and a time interval relative to a transmission moment of the measurement result.

Optionally, there is a time interval between sending times of a plurality of measurement signals whose parameter information overlaps.

Optionally, in a case that the associated information includes the identifier information, the obtaining a measurement result includes:

obtaining a measurement result message, where the measurement result message carries one or more measurement results and identifier information of each measurement result.

Optionally, the payload of the measurement result message carries the one or more measurement results and the identifier information of each measurement result, the payload has a fixed size or a variable size, and in a case that the payload has a variable size, the measurement result message further carries a measurement result number indicator.

Optionally, in a case that the associated information includes the feedback resource, the first terminal is allocated with a feedback resource of the measurement result when sending the measurement signal, and the measurement signal associated with the measurement result includes:

a measurement signal corresponding to the feedback resource of the measurement result.

Optionally, the feedback resource is used to send data, and the measurement result is carried in the data for feedback.

Optionally, in a case that the associated information includes the HARQ feedback information, the HARQ feedback information is HARQ feedback information sent together with the measurement result, the data sent by the first terminal carries a measurement signal, and the measurement signal associated with the measurement result includes:

a measurement signal carried by data corresponding to the HARQ feedback information of the measurement result.

When the terminal is the second terminal:

The radio frequency unit 801 is configured to send a sidelink measurement result, where associated information of the measurement result corresponds to a measurement signal associated with the measurement result, and the associated information includes at least one of the following:

a feedback window, identifier information, a feedback resource, and HARQ feedback information, where the HARQ feedback information is HARQ feedback information sent together with the measurement result, and the HARQ feedback information corresponds to a measurement signal.

Optionally, in a case that the associated information includes the feedback window, a measurement signal received by the second terminal is associated with at least one feedback window, and the measurement signal associated with the measurement result includes:

a measurement signal associated with a feedback window of the measurement result.

Optionally, the at least one feedback window associated with the measurement signal received by the second terminal includes:

at least one feedback window that is started after the second terminal receives the measurement signal, where an attribute of the at least one feedback window is related to at least one of the following parameters:

a terminal processing capability, a resource pool configuration, BWP numerology, a BWP SCS, carrier numerology, a carrier SCS, cell numerology, and a cell SCS.

Optionally, an attribute of the at least one feedback window does not change, or an attribute of the at least one feedback window is dynamically adjusted according to a quality of service (QoS) requirement, a channel state, or a link congestion status.

Optionally, if the second terminal cannot feed back the measurement result within the at least one feedback window, the measurement result is discarded; and/or if the second terminal receives a new measurement signal in the at least one feedback window, the second terminal discards the measurement signal and measurement result corresponding to the at least one feedback window, starts at least one feedback window associated with the new measurement signal, and feeds back a measurement result of the new measurement signal.

Optionally, in a case that the associated information includes the identifier information, the identifier information is used to associate with a measurement signal, and the measurement signal associated with the measurement result includes: the measurement signal associated with the identifier information; or the identifier information is used to associate with parameter information of a measurement signal, and the measurement signal associated with the measurement result includes: the measurement signal corresponding to the parameter information associated with the identifier information.

Optionally, the parameter information includes at least one of the following:

time domain information, frequency domain information, code domain information, an identifier, feedback window information, control signaling information, and a time interval relative to a transmission moment of the measurement result.

Optionally, there is a time interval between sending times of a plurality of measurement signals whose parameter information overlaps.

Optionally, if there are a plurality of measurement results with the same identifier information, at least one of the plurality of measurement results is fed back, or the plurality of measurement results are combined and the combined measurement results are fed back.

Optionally, in a case that the associated information includes the identifier information, the sending a measurement result includes:

sending a measurement result message, where the measurement result message carries one or more measurement results and identifier information of each measurement result.

Optionally, the payload of the measurement result message carries the one or more measurement results and the identifier information of each measurement result, the payload has a fixed size or a variable size, and in a case that the payload has a variable size, the measurement result message further carries a measurement result number indicator.

Optionally, in a case that the associated information includes the feedback resource, the second terminal obtains the feedback resource of the measurement result when receiving the measurement signal, and the second terminal sends the measurement result on the feedback resource.

Optionally, the feedback resource is used to send data, and the second terminal sends, on the feedback resource, data that carries the measurement result.

Optionally, in a case that the associated information includes the HARQ feedback information, data received by the second terminal carries a measurement signal, and the measurement result of the measurement signal is fed back together with the HARQ feedback information of the data.

The terminal can improve transmission performance of the sidelink, and can also avoid sidelink transmission adjustment errors.

It should be understood that, in some embodiments of the present disclosure, the radio frequency unit 801 may be configured to receive and send information or receive and send a signal in a call process. Specifically, after receiving downlink data from a base station, the radio frequency unit sends the downlink data to the processor 810 for processing. In addition, the radio frequency unit 801 sends uplink data to the base station. Generally, the radio frequency unit 801 includes but is not limited to, an antenna, at least one amplifier, a transceiver, a coupler, a low noise amplifier, a duplexer, and the like. In addition, the radio frequency unit 801 may communicate with a network and another device through a wireless communications system.

The terminal provides a user with wireless broadband Internet access by using the network module 802, for example, helping the user receive and send an email, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received sound, or a message received sound) related to a specific function implemented by the terminal 800. The audio output unit 803 includes a loudspeaker, a buzzer, a receiver, and the like.

The input unit 804 is configured to receive an audio signal or a video signal. The input unit 804 may include a graphics processing unit (GPU) 8041 and a microphone 8042. The graphics processing unit 8041 processes image data of a static image or video obtained by an image capture apparatus (such as, a camera) in a video capture mode or an image capture mode. A processed image frame may be displayed on the display unit 806. An image frame processed by the graphics processing unit 8041 may be stored in the memory 809 (or another storage medium) or sent via the radio frequency unit 801 or the network module 802. The microphone 8042 may receive a sound and can process such sound into audio data. Processed audio data may be converted, in a telephone call mode, into a format that can be sent to a mobile communication base station via the radio frequency unit 801 for output.

The terminal 800 further includes at least one type of sensor 805, such as a light sensor, a motion sensor, and another sensor. Specifically, the light sensor includes an ambient light sensor and a proximity sensor, where the ambient light sensor can adjust brightness of the display panel 8061 based on brightness of ambient light, and the proximity sensor can turn off the display panel 8061 and/or backlight when the terminal 800 is moved to an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for the user. The display unit 806 may include a display panel 8061, and the display panel 8061 may be configured in a form of liquid crystal display (LCD), organic light-emitting diode (OLED), or the like.

The user input unit 807 may be configured to receive input digit or character information and generate key signal input related to a user setting and function control of the terminal. Specifically, the user input unit 807 includes a touch panel 8071 and another input device 8072. The touch panel 8071 is further referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 can include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 810; and receives and executes a command sent by the processor 810. In addition, the touch panel 8071 may be implemented as a resistive type, a capacitive type, an infrared type, a surface acoustic wave type, or the like. The user input unit 807 may further include the another input device 8072 in addition to the touch panel 8071. Specifically, the another input device 8072 may include but is not limited to a physical keyboard, a function button (such as a volume control button or a power on/off button), a trackball, a mouse, a joystick, and the like. Details are not described herein.

Further, the touch panel 8071 may cover the display panel 8061. When detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. In FIG. 8, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface connecting an external apparatus and the terminal 800. For example, the external apparatus may include a wired or wireless headset port, an external power supply (or battery charger) port, a wired or wireless data port, a storage card port, a port configured to connect to an apparatus having a recognition module, an audio input/output (I/O) port, a video I/O port, a headset port, and the like. The interface unit 808 may be configured to receive an input (such as data information or electric power) from the external apparatus and transmit the received input to one or more elements of the terminal 800, or may be configured to transmit data between the terminal 800 and the external apparatus.

The memory 809 may be configured to store a software program as well as various types of data. The memory 809 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 809 may include a high-speed random access memory, and may further include a non-volatile memory such as at least one magnetic disk storage device, a flash memory device, or another volatile solid-state storage device.

The processor 810 is a control center of the terminal, and is connected to all parts of the entire terminal by using various interfaces and lines, and performs various functions of the terminal and processes data by running or executing the software program and/or a module that are stored in the memory 809 and invoking the data stored in the memory 809, to implement overall monitoring on the terminal. The processor 810 may include one or more processing units. Optionally, an application processor and a modem processor may be integrated into the processor 810. The application processor mainly processes an operating system, a user interface, an application program, and the like. The modem processor mainly processes wireless communications. It can be understood that alternatively, the modem processor may not be integrated into the processor 810.

The terminal 800 may further include a power supply 811 (for example, a battery) that supplies power to each component. Optionally, the power supply 811 may be logically connected to the processor 810 by using a power management system, to implement functions such as charging, discharging, and power consumption management by using the power management system.

In addition, the terminal 800 includes some function modules not shown, and details are not described herein.

Optionally, some embodiments of the present disclosure further provide a terminal, including a processor 810, a memory 809, and a computer program stored in the memory 809 and executable on the processor 810. When the computer program is executed by the processor 810, the processes of the foregoing embodiments of the sidelink measurement result obtaining method or the sidelink measurement result sending method are implemented, with the same technical effects achieved. To avoid repetition, details are not described herein again.

Some embodiments of the present disclosure further provide a computer-readable storage medium. The computer-readable storage medium stores a computer program. When the computer program is executed by a processor, steps of the sidelink measurement result obtaining method provided in some embodiments of the present disclosure are implemented, or when the computer program is executed by a processor, steps of the sidelink measurement result sending method provided in some embodiments of the present disclosure are implemented, and a same technical effect can be achieved. To avoid repetition, details are not described herein again. The computer-readable storage medium is, for example, a read-only memory (ROM for short), a random access memory (RAM for short), a magnetic disk, or an optical disc.

It may be understood that the embodiments described in some embodiments of the present disclosure may be implemented by hardware, software, firmware, middleware, microcode, or a combination thereof. For implementation with hardware, the module, unit, submodule, subunit, and the like may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of this application, or a combination thereof.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A sidelink measurement result obtaining method, performed by a first terminal, and comprising:

waiting to receive a sidelink measurement result in at least one feedback window;

wherein a measurement signal sent by the first terminal is associated with the at least one feedback window, and the measurement signal is associated with the sidelink measurement result;

wherein the sidelink measurement result associated with measurement signal is sent in any slot of the at least one feedback window associated with the measurement signal; and the feedback window is a timer measured in slots;

wherein if the at least one feedback window expires and no sidelink measurement result is obtained, the first terminal no longer waits for a sidelink measurement result of the measurement signal associated with the at least one feedback window;

wherein the at least one feedback window associated with the measurement signal sent by the first terminal comprises:

at least one feedback window that is started after the first terminal sends the measurement signal, wherein an attribute of the at least one feedback window is related to the following parameter: a BWP subcarrier spacing (SCS);

wherein the attribute of the at least one feedback window comprises a length of the at least one feedback window.

2. The method according to claim 1, wherein an attribute of the at least one feedback window is further related to at least one of the following parameters:

a terminal processing capability, a resource pool configuration, bandwidth part (BWP) parameter set numerology, carrier numerology, a carrier SCS, cell numerology, and a cell SCS.

3. The method according to claim 1, wherein an attribute of the at least one feedback window is dynamically adjusted according to a quality of service (Qos) requirement, a channel state, or a link congestion status.

4. The method according to claim 1, wherein the associated information further comprises identifier information, the identifier information is used to associate with a measurement signal, and the measurement signal associated with the sidelink measurement result comprises: the measurement signal associated with the identifier information; or the identifier information is used to associate with parameter information of a measurement signal, and the measurement signal associated with the sidelink measurement result comprises: the measurement signal corresponding to the parameter information associated with the identifier information.

5. The method according to claim 4, wherein the parameter information comprises at least one of the following:

time domain information, frequency domain information, code domain information, an identifier, feedback window information, control signaling information, and a time interval relative to a transmission moment of the sidelink measurement result.

6. The method according to claim 5, wherein there is a time interval between sending times of a plurality of measurement signals whose parameter information overlaps.

7. The method according to claim 1, wherein the associated information further comprises identifier information, the waiting to receiving a sidelink measurement result in at least one feedback window, comprises:

receiving a measurement result message, wherein the measurement result message carries one or more sidelink measurement results and identifier information of each sidelink measurement result.

8. The method according to claim 7, wherein the payload of the measurement result message carries the one or more sidelink measurement results and the identifier information of each sidelink measurement result, the payload has a fixed size or a variable size, and in a case that the payload has a variable size, the measurement result message further carries a measurement result number indicator.

9. A terminal, wherein the terminal is a first terminal and comprises: a memory, a processor, and a program stored in the memory and executable on the processor, and the program is executed by the processor to implement:

waiting to receive a sidelink measurement result in at least one feedback window, wherein associated information of the sidelink measurement result corresponds te a measurement signal associated with the sidelink measurement result, the associated information is used to identify the measurement signal and to find the measurement signal fails, and the associated information comprises the at least one feedback window;

wherein a measurement signal sent by the first terminal is associated with the at least one feedback window, and the measurement signal is associated with the sidelink measurement result-comprises: a measurement signal associated with the at least one feedback window of the sidelink measurement result;

wherein the sidelink measurement result associated with measurement signal is sent in any slot of the at least one feedback window associated with the measurement signal; and the feedback window is a timer measured in slots;

wherein if the at least one feedback window expires and no sidelink measurement result is obtained, the first terminal no longer waits for a sidelink measurement result of the measurement signal associated with the at least one feedback window;

wherein the program is executed by the processor to further implement:

at least one feedback window that is started after the first terminal sends the measurement signal, wherein an attribute of the at least one feedback window is related to the following parameter: a BWP subcarrier spacing (SCS);

wherein the attribute of the at least one feedback window comprises a length of the at least one feedback window.

10. The terminal according to claim 9, wherein an attribute of the at least one feedback window is further related to at least one of the following parameters:

a terminal processing capability, a resource pool configuration, bandwidth part (BWP) parameter set numerology, carrier numerology, a carrier SCS, cell numerology, and a cell SCS.

11. The terminal according to claim 9, wherein an attribute of the at least one feedback window is dynamically adjusted according to a quality of service (QosS) requirement, a channel state, or a link congestion status.

12. A terminal, wherein the terminal is a second terminal and comprises: a memory, a processor, and a program stored in the memory and executable on the processor, and the program is executed by the processor to implement:

sending a sidelink measurement result in at least one feedback window;

wherein a measurement signal received by the second terminal is associated with the at least one feedback window, and the measurement signal is associated with the sidelink measurement result;

wherein the sidelink measurement result associated with measurement signal is sent in any slot of the at least one feedback window associated with the measurement signal; and the feedback window is a timer measured in slots;

wherein if the second terminal cannot feedback the sidelink measurement result within the at least one feedback window, the sidelink measurement result is discarded;

wherein the program is executed by the processor to further implement:

at least one feedback window that is started after the second terminal receives the measurement signal, wherein an attribute of the at least one feedback window is related to the following parameter: a BWP subcarrier spacing (SCS);

wherein the attribute of the at least one feedback window comprises a length of the at least one feedback window.

13. The terminal according to claim 12, wherein the program is executed by the processor to further implement:

wherein an attribute of the at least one feedback window is further related to at least one of the following parameters:

a terminal processing capability, a resource pool configuration, BWP numerology, carrier numerology, a carrier SCS, cell numerology, and a cell SCS.

14. The terminal according to claim 12, wherein an attribute of the at least one feedback window is dynamically adjusted according to a quality of service (Qos) requirement, a channel state, or a link congestion status.

15. The terminal according to claim 9, wherein the associated information further comprises identifier information, the identifier information is used to associate with a measurement signal, and the measurement signal associated with the sidelink measurement result comprises: the measurement signal associated with the identifier information; or the identifier information is used to associate with parameter information of a measurement signal, and the measurement signal associated with the sidelink measurement result comprises: the measurement signal corresponding to the parameter information associated with the identifier information.

16. The terminal according to claim 15, wherein the parameter information comprises at least one of the following:

time domain information, frequency domain information, code domain information, an identifier, feedback window information, control signaling information, and a time interval relative to a transmission moment of the sidelink measurement result.

17. The terminal according to claim 16, wherein there is a time interval between sending times of a plurality of measurement signals whose parameter information overlaps.

18. The terminal according to claim 9, wherein the associated information further comprises identifier information, when waiting to receiving a sidelink measurement result in at least one feedback window, the program is executed by the processor to implement:

receiving a measurement result message, wherein the measurement result message carries one or more sidelink measurement results and identifier information of each sidelink measurement result.

19. The terminal according to claim 18, wherein the payload of the measurement result message carries the one or more sidelink measurement results and the identifier information of each sidelink measurement result, the payload has a fixed size or a variable size, and in a case that the payload has a variable size, the measurement result message further carries a measurement result number indicator.

20. The terminal according to claim 12, wherein the parameter information comprises at least one of the following:

time domain information, frequency domain information, code domain information, an identifier, feedback window information, control signaling information, and a time interval relative to a transmission moment of the sidelink measurement result.

* * * * *